Dec. 24, 1946.   J. A. POTTER   2,413,033
VOLTAGE REGULATED RECTIFYING SYSTEM
Filed July 29, 1942   2 Sheets-Sheet 1

INVENTOR
J. A. POTTER
BY
E. V. Griggs
ATTORNEY

Dec. 24, 1946.    J. A. POTTER    2,413,033
VOLTAGE REGULATED RECTIFYING SYSTEM
Filed July 29, 1942    2 Sheets-Sheet 2

INVENTOR
J. A. POTTER
BY
E. V. Griggs
ATTORNEY

Patented Dec. 24, 1946

2,413,033

UNITED STATES PATENT OFFICE 2,413,033

VOLTAGE REGULATED RECTIFYING SYSTEM

James A. Potter, Rutherford, N. J., assignor to Bell Telephone Laboratories, Incorporated, New York, N. Y., a corporation of New York Application July 29, 1942, Serial No. 452,728

10 Claims. (Cl. 175—363)

This invention relates to voltage regulators for alternating current rectifying systems.

An object of the invention is to provide an inexpensive device for regulating the voltage of rectified current.

An additional object of the invention is to cause the voltage supplied by a rectifying system to a load to be held substantially constant irrespective of variations in the load current.

Another object of the invention is to enable a thermistor employed in a voltage regulating systems to be placed at a sensitive point in its resistance thermal characteristic under the condition of no load.

In accordance with the invention there is interposed between an alternating current source of a rectifying system and the load circuit to which the rectifying system supplies unidirectional current a series impedance element the resistance of which is a function of the temperature of the element. When the element is cold its resistance is very high. When its temperature rises the resistance decreases and at a certain point in its characteristic the rate of fall of the resistance is extremely high. Such elements, known as thermistors, are described by Pearson in the Bell Laboratories Record for December 1940. In the operation of the rectifier system the resistance of the thermistor at the low temperatures associated with low load current is relatively high. As the load current rises the heating effect of the current upon the thermistor also rises reducing the thermistor resistance to compensate for the increased resistance of the rectifier and current supply circuit. Additional heating of the thermistor to accentuate the change in its resistance may be obtained by associating it in physically close relation to the rectifier or the current supply transformer to facilitate heat transfer to the thermistor. The thermistor may be initially brought to the proper point on its resistance temperature characteristic at no load by a separate heating circuit connected to an auxiliary winding of the current supply transformer. In order to prevent the introduction of ripples by the auxiliary heating circuit in the load current the heating circuit may include an auxiliary rectifier and filter or the thermistor may be connected between the load current rectifier and the load current filter.

Since the function of the thermistor is to reduce the voltage derived from the alternating current source by an amount which varies in inverse manner with the load current, the thermistor may be placed either in an alternating current input lead to the main rectifier or in a direct current output lead of that rectifier. The heat supplied to the thermistor by the auxiliary heating circuit may be controlled by a relay responsive to the rectified voltage impressed upon the unidirectional current load circuit in such a manner as to close the auxiliary circuit when that voltage is low and to open it when it is high. The relay may thus supply intermittent heating effects to the thermistor which are smoothed out by the thermal inertia of the thermistor.

Other features and aspects of the invention will be apparent from a consideration of the following detailed specification taken in connection with the accompanying drawings in which.

Figure 1:
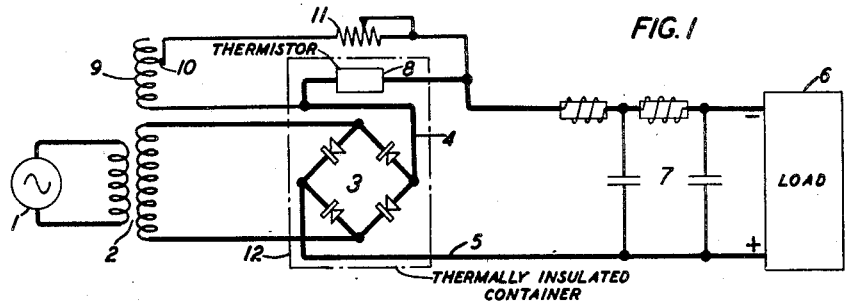
Fig. 1 is a circuit diagram of an alternating current rectifying system with provisions for regulating the voltage supplied to the load in accordance with certain principles of this invention.

Referring to Fig. 1 a source 1 of alternating current to be rectified is shown connected by a current supply transformer 2 to a full wave rectifier 3 of well-known type the output leads 4 and 5 of which conduct rectified current to the unidirectional current load 6 through a smoothing filter 7. The transformer 2 is provided with an auxiliary secondary winding 9 having a variable tap 10 and variable resistor 11 in series therewith for supplying an alternating heating current directly to thermistor 8. At the no load condition the only current in the thermistor 8 is alternating current derived from the secondary winding 8 and the magnitude of which is determined by the position of variable tap 10 and the setting of variable resistor 11 in order to fix the temperature of thermistor 8 at a point for which the resistance of the thermistor lies within the required operating range. This is highly desirable for the reason that the resistance temperature characteristic of the thermistor begins with a rapidly rising portion reaching a point beyond which the resistance rapidly falls and it is desired to operate on the falling portion of the characteristic. At higher loads there is a potential drop in the current supply transformer, the rectifier and the circuit conductors which tends to reduce the rectified voltage available at the load input terminals. Since, however, the temperature of the thermistor 8 rises rapidly with increased load current, the resistance of the thermistor consequently undergoes a large decrease, thus reducing the potential drop across the thermistor so that the unidirectional voltage applied to the load remains substantially constant. The initial setting of the transformer tap and of the variable resistance may be changed from time to time to take care of aging in the rectifier and to allow for operation in several ambient temperature ranges.

The filter 7 not only smooths out the rectified current but also keeps the alternating current impressed directly upon the thermistor from reaching the load. The elements of the full wave rectifier may be of the well-known copper oxide type.

In order to still further accentuate the resistance change of thermistor 8 with varying load the thermistor may be mounted in close proximity to the rectifier 3 to be subjected to the heat developed by the rectifier. If desired the rectifier 3 and thermistor 8 may be enclosed in a common thermally insulated enclosure or housing 12 to stabilize the thermal environment and reduce extraneous effects.

Figure 2:
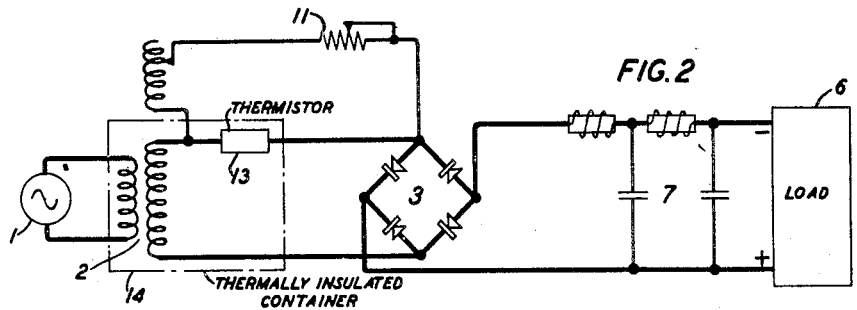
Fig. 2 is a circuit diagram of a modification of the system of Fig. 1 in which the series thermistor element is connected in the alternating current input circuit of the rectifier.

Fig. 2 discloses a modification of the system of Fig. 1 in which the thermistor 13 is connected in series in one of the alternating current input leads to the rectifier 3. In this circuit the thermistor 13 and the transformer 2 may be mounted in close proximity to each other to facilitate heat transfer from the transformer to the thermistor. If desired they may be enclosed within a thermally insulated container or housing 14.

Figure 3:
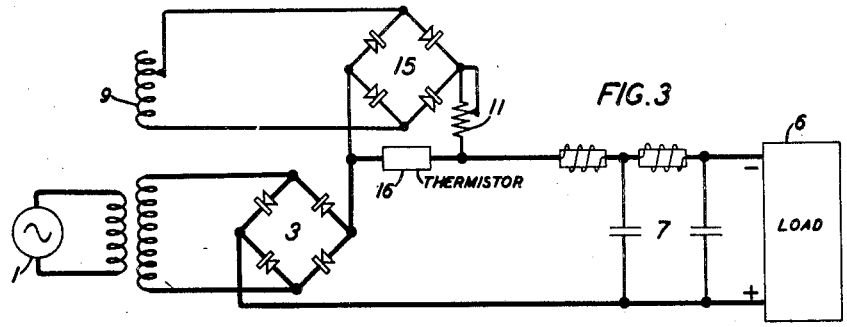
Fig. 3 is another modification in which the auxiliary heating circuit of the thermistor is provided with an auxiliary rectifier.

The system of Fig. 3 is similar to that of Fig. 1 but adds an auxiliary full wave rectifier 15 in the circuit connecting transformer winding 9 and the thermistor 16. Accordingly the heating current for the thermistor introduces into the output circuit of the main rectifier 3 only a unidirectional voltage accompanied by ripples which may be readily suppressed by the smoothing filter 7.

Figure 4:
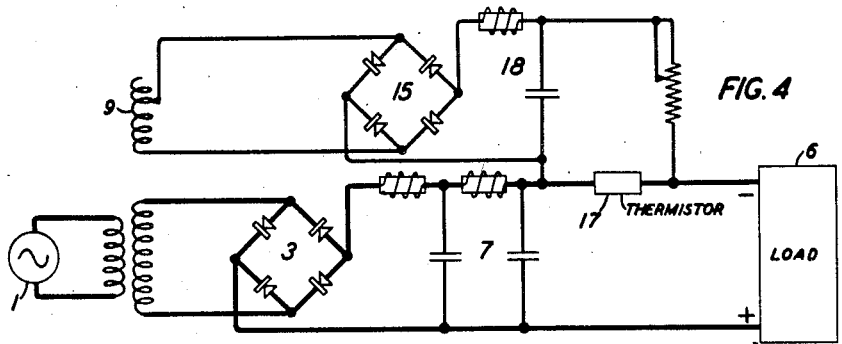
Fig. 4 illustrates a modification of the circuit of Fig. 3 in which the thermistor is connected between the current supply filter and the load.

In the system of Fig. 4 the thermistor 17 is supplied with unidirectional heating current over a path including the secondary winding 9 of the current supply transformer, auxiliary full wave rectifier 15, and an auxiliary smoothing filter 18. It is accordingly possible to connect the thermistor 17 immediately adjacent the input terminals of the load 6 since the thermistor is not subjected to heating current variations or ripples.

Figure 5:
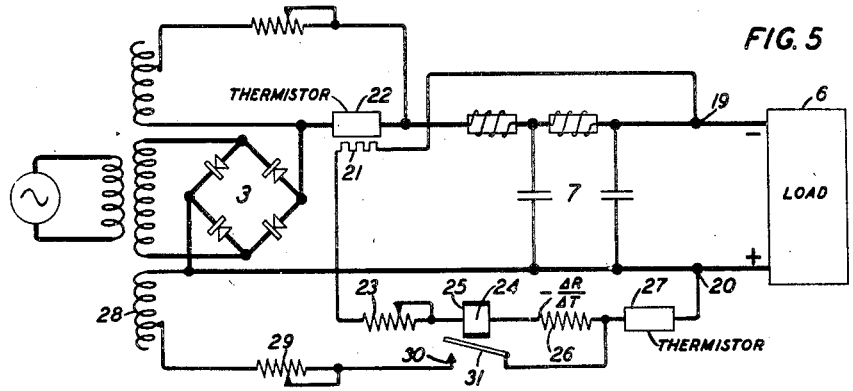
Fig. 5 is a circuit diagram of a voltage regulated rectifying current supply system in which the series thermistor is provided with an additional indirect heating circuit.

The system of Fig. 5 adds to the circuit of Fig. 1 a shunt path connected directly across the input terminals 19 and 20 to the load. This shunt path, as will be later explained in detail, is of such character as to draw a current $I_T$ which changes enormously for small variations in the electromotive force applied to the load input terminals. Because of this very great change in the current $I_T$ through the shunt path two additional regulating effects are brought about. The first is occasioned by the fact that the shunt current $I_T$ traverses the series thermistor 22 and therefore changes the resistance of thermistor 22 and the consequent potential drop across the thermistor as does a change in the load current itself. In the second place the current $I_T$ of the shunt path is caused to traverse an indirect heater 21 of the thermistor 22 to produce an additional effect upon the resistance of that thermistor. It will therefore be apparent that very slight changes in the voltage applied by the system across 19 and 20 to the load will set into action correcting factors which will tend to hold that potential very closely constant irrespective of changes in the magnitude of the load current.

Figure 6:
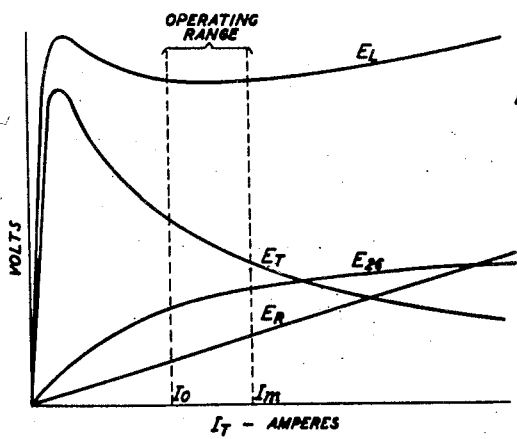
Fig. 6 is a graph employed to explain the operation of the circuit of Fig. 5.

It remains to consider the action of the shunt path in drawing the shunt current $I_T$ which changes greatly for small changes in the voltage applied to the load terminals. Assume that the system is in operation with the relay 24 energized as shown in Fig. 5 so that its armature 31 is withdrawn from the fixed contact 30. The shunt path connecting points 19 and 20 comprises a thermistor 27, a special resistor 26, winding of relay 24, variable resistor 23 and the heater 21 of thermistor 22. The characteristics of the elements of this shunt path are illustrated in Fig. 6, it being understood that the apparatus is designed for operation for shunt currents $I_T$ extending over a range of $I_o$ to $I_m$. The voltage current characteristic $E_T$ of thermistor 27 is such that the potential difference across the thermistor falls rapidly and non-linearly from its magnitude at current $I_o$ to the magnitude which it assumes at the larger current $I_m$. In fact, the thermistor 27 considered alone is unstable since the greater its current and internal heating becomes, the less its resistance and the greater the current it will tend to accept. This large change in current is conducive to effective regulation in its effect upon the resistance of the series thermistor 22. However, the fall in potential across the thermistor 27 of the shunt path would by itself be very detrimental to maintenance of a constant potential across the load terminals 19, 20. To reduce this potential variation across the shunt path as a whole while retaining the feature of large change in current characteristic of the thermistor 27 there are introduced resistance element 23 and the resistance of winding 24 of relay 25. These may be made substantially linear so that their aggregate potential drop as represented by $E_R$ will be a straight line. It will be apparent that adding the potentials $E_R$ and $E_T$ will yield a more nearly horizontal potential throughout the range of $I_o$ to $I_m$. However, since $E_T$ is far from linear the resultant obtained by adding $E_R$ and $E_T$ will have a corresponding non-linearity or curvature. This may be much reduced and the total shunt path potential made more nearly horizontal with change in current by the introduction of a resistor 26 which preferably consists of some such material as silicon carbide which has a negative coefficient of resistance with increased current. The terminal potential $E_{26}$ which such a negative coefficient resistance element will support rises with current but less rapidly than does the current. The addition of the potential $E_{26}$ to those of $E_R$ and $E_T$ yields a nearly horizontal electromotive force $E_L$ throughout the range of shunt currents from $I_o$ to $I_m$. Thus, it is possible to take advantage of the wide variation in current characteristic of thermistor 27 without permitting the potential difference across the shunt path connected between points 19 and 20 to vary more than a slight amount.

In operation, the shunt current $I_T$ stabilizes at some magnitude at which the three potentials $E_R$, $E_{26}$ and $E_T$ will add up to equal the load voltage $E_L$ which is available after subtracting the series potential drops across the filter 7 and thermistor 22 from the voltage delivered at the output terminals of the rectifier. If the system be designed and the variable resistors adjusted to cause the apparatus to tend to operate at a point such that the shunt current $I_T$ lies between $I_o$ and $I_m$, as the voltage supplied across terminals 19 and 20 to the load slightly decreases the current $I_T$ will greatly increase. Conversely, if the load voltage $E_L$ increases the current $I_T$ will decrease.

The purpose of the third transformer winding 28, the relay 25 and the variable resistor 29 is to provide, at the time the circuit is energized, a high enough voltage to thermistor 27 to bring it within its operating range. When this operating range of temperatures has been reached the current through the thermistor 27 becomes great enough to operate marginal relay 25 thus actuating its armature 31 to withdraw it from engagement with the contact point 30.

Figure 7:
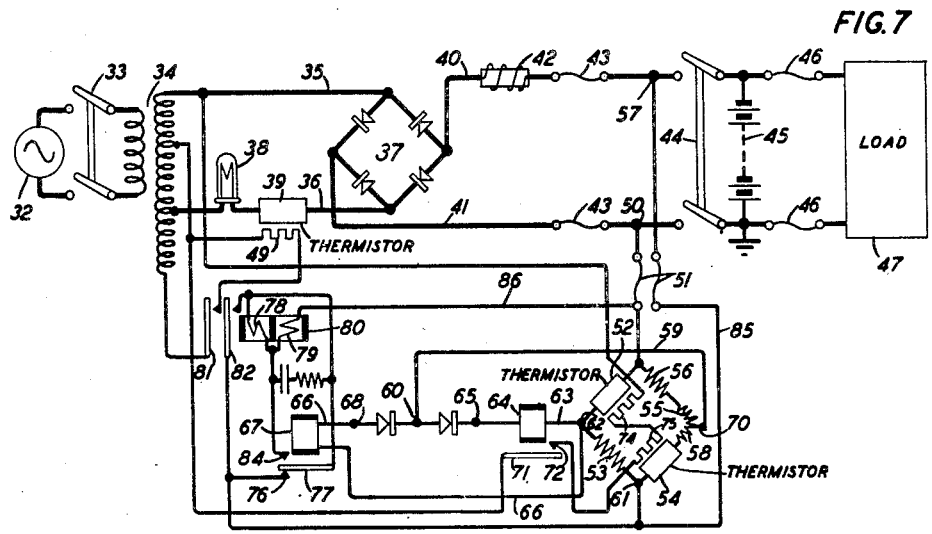
Fig. 7 is a circuit diagram of a system for regulating the voltage of rectified current in which the indirect heating circuit of the regulating thermistor is intermittently energized in response to the operation of a Wheatstone bridge connected directly across the load circuit.

Fig. 7 discloses a system for rectifying alternating currents which is similar to that of Fig. 5 in that it involves an L network comprising a shunt control arm to control indirect heating of a series thermistor arm. As shown the apparatus is in unenergized condition with its starting switches open and the various relays and control circuits in released or idle condition. In this circuit a source 32 may be connected through switch 33 with current supply transformer 34 from the secondary winding of which leads 35 and 36 extend to the full wave rectifier 37. Connected in series in the alternating current input lead 36 are ballast lamp 38 and a thermistor 39. The unidirectional output current leads 40 and 41 extend from the rectifier by way of the smoothing choke 42 and the charge fuses 43 and the switch 44 to the terminals of a storage battery 45, and from these terminals through the discharge fuses 46 to the terminals of the unidirectional current load 47.

The ballast lamp 38 by abruptly changing its resistance to a higher magnitude when the safe rectifier current is exceeded prevents overloading of the rectifier. The resistance of the thermistor 39 varies in accordance with the series load current therethrough. It is also indirectly affected by an associated heater element 49 which is intermittently operated in response to the operation of a shunt control circuit. The shunt control circuit leads from point 50 by way of the regulator fuses 51 to the four-arm Wheatstone bridge comprising thermistor 52, fixed resistor 53, thermistor 54, variable tap resistor 55 and resistor 56 to point 61 and by way of conductor 85 to point 57. From the conjugate point 58 a variable tap 70 and lead 59 provide a path to junction point 60 of a two-arm varistor valve. From the other conjugate point 62 of the shunt control bridge a lead 63 connects the winding of relay 64 to one terminal 65 of the valve while a path 66 connects the winding of relay 67 to the remaining terminal 68 of the varistor valve. If the variable tap 70 be properly positioned at a given temperature and a given applied load voltage between points 50 and 57 the shunt control bridge will be balanced and no difference of potential will exist between points 62 and 70. If the rectified voltage impressed between points 50 and 57 should rise the bridge will be unbalanced to send unidirectional current over the circuit 59, 66 in one direction. If the impressed voltage across points 50 and 57 should fall the bridge will be unbalanced to send current over the circuit 59, 63, in the opposite direction.

The two-arm varistor valve includes an asymmetrically conducting arm adjacent the terminal 65 which is so poled as to permit current of one polarity only to pass to the winding of relay 64. This, in effect, makes the relay 64 a polarized relay. Similarly current of opposite polarity only is permitted by the other asymmetric arm adjacent terminal 68 to pass through the winding of relay 67, thus effectively making that relay polarized but in an opposite manner from relay 64.

With the apparatus in proper adjustment, assuming that the switches 33 and 44 have just been closed, the thermistors 52 and 54 of the shunt control bridge will be cold and the shunt control bridge will be unbalanced in such direction as to send current from the storage battery 45 through the winding of the starting relay 64. The relay 64 thereupon energizes attracting its armature 71 and closing at its contact 72 a circuit extending through the heater windings 74 and 75 of thermistors 52 and 54, respectively. In a few seconds thermistors 52 and 54 have warmed to such a degree as to greatly reduce their resistance. Under these circumstances current will traverse these thermistor elements 52 and 54 in sufficient magnitude to maintain their temperature within the downward operating range of their resistance temperature characteristic. In consequence of the reduction of resistance of the thermistors 52 and 54 the shunt control bridge becomes unbalanced in the opposite direction causing the starting relay 64 to release and sending a current through the winding of relay 67. The release of relay 64 interrupts the heating current passing through heaters 74 and 75 of thermistors 52 and 54 but the current which now passes directly through these thermistors is sufficient to maintain their operating temperature.

At the time that switch 44 is closed in starting the apparatus current is applied through the fuses 51 over leads 85 and 86, fixed contact 76 and armature 77 of relay 67 to operating winding 78 and resistance winding 79 of relay 80. Relay 80 thereupon energizes and attracts its outer armature 81 to close the circuit through heater 49 of series thermistor 39. At the same time it attracts inner armature 82, establishing a holding circuit for itself by an alternative path around armature 77 so that a momentary actuation of relay 67 to open the energizing circuit of relay 80 at contact 76, 77 will not cause relay 80 to deenergize. It will be apparent, therefore, that as soon after the switch 44 is closed connecting storage battery 45 to the terminals of the control bridge and to the leads 85, 86 of the circuit of relay 80 as will afford sufficient time for relay 80 to energize heating of the thermistor 39 will begin. It will continue until such a time as relay 67 is energized breaking the contact between its armature 77 and the fixed contact 76 and moving armature 77 into engagement with contact 84, thus short-circuiting winding 78 and permitting the release of armature 81.

In one embodiment of the circuit of Fig. 7 with a alternating current supply at the primary winding of transformer 34 of 115 volts, 50 to 60 cycles, the apparatus was designed for battery charging service to supply a current varying from zero to one ampere at 17 volts. In this particular embodiment the resistance of element 53 was 700 ohms, element 55 was 400 ohms, and element 56 was 300 ohms. The heater windings 74 and 75 of thermistors 52 and 54 were of 140 ohms resistance. Upon operation of relay 64 these windings were subjected to an alternating voltage of 24 volts. With the control bridge balanced the potential difference between the conjugate points 58 and 62 is of course zero. When, however, the circuit is first put into operation by closing switches 33 and 46, since thermistors 52 and 54 are cold and their resistance is high, the bridge is very much unbalanced so as to make the point 70 highly positive with respect to the point 62. When in a few seconds the resistance of thermistors 52 and 54 has been reduced by the heating effect of heaters 74 and 75 the bridge becomes unbalanced in the opposite direction to make terminal 62 positive with reference to terminal 58. Thereafter in operation the terminal 62 always remains positive with reference to terminal 58 so that current passes at all times through the winding of relay 67. Relay 67 is marginal in its operation and is sensitive enough to operate on an unbalanced voltage such as is impressed upon it when the unidirectional voltage across points 50 and 57 rises to 17.3 volts and releases when that impressed electromotive force falls to 17.0 volts. Accordingly, so long as the circuit remains in operation the thermistor 39 will begin to receive heat from its heater 49 shortly after the load voltage falls to 17.0 volts and will continue to receive heat until the load voltage rises to 17.3 volts. The output voltage does not rapidly change between the limiting values of 17.0 and 17.3 volts since the thermistor 39 and its heating element have a considerable thermal inertia. Accordingly, at the beginning of the heating operation heat is applied slowly and at the end of the heating operation heat is applied more slowly than in the middle of the heating period. Moreover, after the heating current has been interrupted heat continues to be applied to the thermistor in decreasing degree. This tends to greatly smooth the regulating operation.

What is claimed is:

1. In combination a rectifier having input terminals to which a source of alternating voltage may be connected and output terminals, means for regulating the voltage of the rectified current delivered from the output terminals of the rectifier to a pair of load terminals including a thermistor connected in series between one of the output terminals and one of the load terminals to set up a potential difference between the terminals which varies inversely with the load current traversing the thermistor, and means energized by an external source to heat the thermistor to a sensitive point on its resistance-temperature characteristic.

2. A transformer having a primary winding on which an alternating voltage to be rectified may be impressed, a secondary winding inductively associated with the primary winding, a full wave rectifier having input terminals connected to the secondary winding and having output terminals adapted to be connected to a load circuit through a regulating system, said regulating system comprising a thermistor and a filter connected in tandem relationship to the output terminals of the rectifier and a second secondary winding associated with the primary winding and connected to the thermistor to supply heating energy thereto.

3. A regulating system for controlling the voltage of the energy supplied to a load comprising an alternating current transformer having input terminals and output terminals, a source of uninterrupted alternating current, a conductive circuit continuously connecting terminals of the alternating current source to the input terminals of the transformer irrespective of load conditions, a load, a load circuit connecting the output terminals of the transformer to the terminals of the load and including a series variable resistance thermistor through which the load energy passes, said thermistor and said transformer windings being in intimate heat conducting relationship whereby the heat generated in the transformer may control the resistance of the thermistor to vary the voltage supplied to the load terminals.

4. A regulating system for controlling the voltage of the energy supplied from a source of voltage to a load comprising a translating device having input terminals, a conductive circuit for continuously connecting the terminals to a source of alternating current irrespective of conditions of the load, said translating device also having an output circuit including terminals for connection to the load, said circuit being continuously closed, and said translating device operating to modify the form of the energy transferred from the source to facilitate its utilization by the load, said translating device presenting resistance whereby heat is generated by the translating device, a thermistor connected in series relationship in a continuously energized circuit to one of the terminals of the translating device so that energy passed to the load traverses the thermistor whereby the thermistor may impose a varying loss of potential to regulate the load voltage as the energy supplied to the load varies, the translating device and the thermistor being mounted in such intimate heat transfer relationship that heat generated by the translating device affects the temperature of the thermistor and hence its resistance.

5. In combination, a transformer having a primary winding, a main secondary winding inductively associated with the primary winding, an auxiliary secondary winding also inductively associated with the primary winding, a full wave rectifier having input terminals connected to the main secondary winding and output terminals, a thermistor and a filter connected in tandem to the output terminals of the rectifier to regulate the voltage supplied to the load and to reduce ripples, and a heating circuit for the thermistor including the thermistor and the auxiliary secondary winding.

6. A source of current, a load, a circuit connecting the source to the load, a shunt path across the connecting circuit including a thermistor whereby the shunt path diverts current from the load to regulate the terminal voltage applied to the load, means for initially heating the thermistor to a temperature at which its resistance is suitable for regulating purposes and means responsive to current passing through the shunt path for disconnecting the initial heating means when the current in the shunt path attains a predetermined magnitude.

7. A source of voltage, a load, means comprising a series thermistor having a falling resistance temperature characteristic throughout a desired range of temperatures connecting the source to the load to regulate the voltage supplied to the load in accordance with the current supplied to the load, an external heater for the thermistor to supplement the heat supplied by the series load current passing therethrough, a path connected in shunt to the load and having two points which are at the same potential when the total output electromotive force across the shunt path is at a normal desired value, a relay having a winding connected between said two points and having an armature and a contact therefor, and a circuit connected to said source to derive an electromotive force therefrom and including in series said external heater and said armature and contact.

8. In combination, a rectifier having input terminals to which a source of alternating voltage may be connected and output terminals, means for regulating the voltage of the rectified current delivered from the output terminals of the rectifier to a pair of load terminals including a thermistor having a falling resistance temperature characteristic connected in series between one of the output terminals and one of the load terminals to set up a potential difference between the terminals which varies inversely with the load current traversing the thermistor, and means energized by an external source to heat the thermistor to a sensitive point in the temperature zone in which the thermistor exhibits the falling resistance-temperature characteristic.

9. In combination, a source of alternating current, a full wave rectifier, a regulating thermistor and a load, all in series circuit relation whereby said source supplies unidirectional current energy to the load, a shunt circuit including a thermistor connected across said load and means controlled by the thermistor of the shunt path to cause abrupt variations in the temperature of the thermistor in the series circuit.

10. In combination, a source of electrical energy, a series impedor and a load, all connected in series circuit, a Wheatstone bridge path connected in shunt to the load and having two points conjugate to the connection points so that for a predetermined terminal voltage no difference in potential exists between the conjugate points, two asymmetrically conducting paths connected between the conjugate points and each including an individual relay, means whereby operation of one relay in response to unbalance potentials serves to initiate a reversal of the direction of unbalance of the bridge and means whereby operation of the other relay in response to oppositely directed unbalance potentials serves to regulate the impedance of the series impedor to control the voltage impressed upon the load.

JAMES A. POTTER.